(12) United States Patent
Tabata et al.

(10) Patent No.: US 8,314,192 B2
(45) Date of Patent: Nov. 20, 2012

(54) INTERPENETRATING POLYMER NETWORK STRUCTURE AND POLISHING PAD, AND PROCESS FOR PRODUCING THE SAME

(75) Inventors: Norikazu Tabata, Otsu (JP); Kazuhiko Hashisaka, Otsu (JP); Masahiro Sugimura, Otsu (JP); Takuo Sakamoto, Koka (JP); Masaki Ue, Kyoto (JP); Hiroyuki Nakayama, Otsu (JP); Seiji Fukuda, Nishinomiya (JP)

(73) Assignee: Toray Industries, Inc., Tokyo (JP)

( * ) Notice: Subject to any disclaimer, the term of this patent is extended or adjusted under 35 U.S.C. 154(b) by 826 days.

(21) Appl. No.: 12/375,371

(22) PCT Filed: Jul. 28, 2006

(86) PCT No.: PCT/JP2006/314950
§ 371 (c)(1),
(2), (4) Date: Jan. 27, 2009

(87) PCT Pub. No.: WO2008/012909
PCT Pub. Date: Jan. 31, 2008

(65) Prior Publication Data
US 2009/0280723 A1 Nov. 12, 2009

(51) Int. Cl.
*C08F 2/00* (2006.01)
(52) U.S. Cl. .......... 526/224; 51/298; 525/350; 525/383; 525/384; 526/89; 526/210; 526/235; 526/328; 526/329.7
(58) Field of Classification Search ............ 51/298; 525/350, 383, 384; 526/89, 210, 224, 235, 526/328, 329.7
See application file for complete search history.

(56) References Cited

U.S. PATENT DOCUMENTS

| 5,324,774 | A | 6/1994 | Nishikawa et al. |
| 6,362,107 | B1 | 3/2002 | Shiro et al. |
| 6,705,934 | B1 | 3/2004 | Shiro et al. |
| 2003/0217517 | A1 | 11/2003 | Allison et al. |

FOREIGN PATENT DOCUMENTS

| CN | 1243132 A | 2/2000 |
| JP | 1-118541 A | 5/1989 |
| JP | 11-153717 A | 6/1999 |
| JP | 2000-71167 A | 3/2000 |
| JP | 2000-143764 A | 5/2000 |
| JP | 2000-218551 | 8/2000 |
| JP | 2000-263422 A | 9/2000 |
| JP | 2000-343413 A | 12/2000 |
| JP | 2001-358101 A | 12/2001 |
| JP | 2004-140253 A | 5/2004 |
| JP | 2005-120253 A | 5/2005 |
| JP | 2005-512832 A | 5/2005 |
| JP | 2006-233198 A | 9/2006 |
| JP | 2006-233199 A | 9/2006 |
| KR | 2003-0056064 A | 7/2003 |
| WO | WO-00/12262 | 3/2000 |

OTHER PUBLICATIONS

Odian, G.; Principles of Polymerization, 2004, p. 239-264.*
Notice of Reasons for Rejection dated Jun. 9, 2011 for corresponding Japanese Application No. 2006-020193.
Notice of Reasons for Rejection dated Jun. 9, 2011 for corresponding Japanese Application No. 2006-047980.
Notice of Reasons for Rejection dated Sep. 2, 2011 for corresponding Japanese Application No. 2006-020193.
Notice of Reasons for Rejection dated Sep. 2, 2011 for corresponding Japanese Application No. 2006-047980.

\* cited by examiner

*Primary Examiner* — David W Wu
*Assistant Examiner* — Robert Jones, Jr.
(74) *Attorney, Agent, or Firm* — Birch, Stewart, Kolasch & Birch, LLP

(57) ABSTRACT

The present invention relates to a process for producing an interpenetrating polymer network structure, which comprises the steps of impregnating a polymer molding with a radical polymerizable composition containing an ethylenically unsaturated compound and a radical polymerization initiator; and polymerizing the ethylenically unsaturated compound in a swollen state of the polymer molding impregnated with the radical polymerizable composition; wherein a chain transfer agent and/or a radical polymerization inhibitor are added to the radical polymerizable composition and/or the polymer molding before impregnating the polymer molding with the radical polymerizable composition. According to the present invention, a highly uniform interpenetrating polymer network structure can be obtained. The present invention also provides a polishing pad which is exhibits high in-plane uniformity of a polishing rate during polishing, and also has excellent flattening properties and improved pad lifetime during polishing, and a process for producing the same.

10 Claims, No Drawings

INTERPENETRATING POLYMER NETWORK STRUCTURE AND POLISHING PAD, AND PROCESS FOR PRODUCING THE SAME

TECHNICAL FIELD

The present invention relates to a process for producing an interpenetrating polymer network structure. The present invention also relates to a polishing pad and a process for producing the same. Particularly, the present invention relates to a polishing pad to be used for flattening an insulating layer surface and a metal wiring surface formed on a semiconductor substrate made of silicone.

BACKGROUND ART

Patent Document 1 discloses a polishing pad comprising a polymer polymerized from polyurethane and a vinyl compound. Patent Document 2 discloses a process for producing a polishing pad, which comprises the steps of immersing a polymer molding in a solution containing a polymerizing monomer and causing a polymerization reaction of the monomer.

However, a conventional polishing pad was insufficient in in-plane uniformity of a polishing rate during polishing because of large variation in properties in or between pads. Also, low pad strength causes problems such as quick abrasion of the pad and a short pad lifetime during polishing.

Furthermore, since a polymerization reaction begins while a polymer molding is impregnated with a monomer and viscosity increases in the production of these polishing pads, there arises a problem that an impregnation rate to the polymer molding decreases and the time required for the production increases. In order to avoid an increase in viscosity, an impregnation temperature must be set to a low temperature and impregnation at a low temperature requires a long impregnation time. Furthermore, a drastic decrease in the impregnation rate caused by an increase in viscosity is prevented by adding an organic solvent to a polymerizing monomer to prepare a solution. Therefore, the step of removing a waste organic solvent after completion of the polymerization was required.

[Patent Document 1] International Publication No. WO00/12262
[Patent Document 2] Japanese Unexamined Patent Publication (Kokai) No. 2000-218551

DISCLOSURE OF THE INVENTION

The object of the present invention is to provide an interpenetrating polymer network structure which has excellent uniformity of properties and is produced with high efficiency, and a process for producing the same. Another object of the present invention is to provide a polishing pad which exhibits high in-plane uniformity of a polishing rate during polishing and has good flattening properties capable of eliminating a level difference in a short time, and also exhibits a small difference in polishing properties between pads and has improved pad lifetime during polishing and is produced with high efficiency, and a process for producing the same.

In order to achieve the above objects, the present invention includes the following constitutions:

(1) A process for producing an interpenetrating polymer network structure, which comprises the steps of impregnating a polymer molding with a radical polymerizable composition containing an ethylenically unsaturated compound and a radical polymerization initiator; and polymerizing the ethylenically unsaturated compound in a swollen state of the polymer molding impregnated with the radical polymerizable composition; wherein a chain transfer agent and/or a radical polymerization inhibitor are added to the radical polymerizable composition and/or the polymer molding before impregnating the polymer molding with the radical polymerizable composition.

(2) A process for producing a polishing pad, which comprises the step of forming a polishing pad using the interpenetrating polymer network structure obtained by the method according to (1).

(3) A polishing pad comprising an interpenetrating polymer network structure containing a polymer molding and a polymer of an ethylenically unsaturated compound, the polishing pad having a thickness of 1 mm or more and a diameter 300 mm or more, wherein a weight ratio of the polymer molding at any position of the polishing pad is within a range of $X\pm3(\%)$ where $X$ (%) denotes an average weight ratio of the polymer molding based on the total weight of the polymer molding and the ethylenically unsaturated compound polymer.

According to the process for producing an interpenetrating polymer network structure of the present invention, there can be obtained an interpenetrating polymer network structure which has excellent uniformity of properties and is produced with high efficiency.

Also, according to the process for producing a polishing pad of the present invention, there can be obtained a polishing pad which exhibits high in-plane uniformity of a polishing rate during polishing, has good flattening properties capable of eliminating differences in level in a short time, also exhibits a small difference in polishing properties between pads, has improved pad lifetime during polishing and is produced with high efficiency.

BEST MODE FOR CARRYING OUT THE INVENTION

In the present invention, the interpenetrating polymer network structure means a polymer having a structure in which polymer networks composed of a plurality of polymers are interpenetrated with each other in a polymer mixed system composed of the plurality of polymers. Also, it may be a structure in which a structure comprising continuous phases each being composed of a different kind of polymers is stabilized by formation of a polymer network.

The interpenetrating polymer network structure in the present invention can be obtained by impregnating a polymer molding composed of a portion of a polymer with an ethylenically unsaturated compound constituting another kind of a polymer, and polymerizing the ethylenically unsaturated compound. The polishing pad of the present invention is composed of an interpenetrating polymer network structure.

In the present invention, the chain transfer agent means a compound which reacts with a growing radical in a radical polymerization reaction thereby terminating an increase in a polymer chain length to produce a low molecular weight radical having reinitiation ability.

Examples of the chain transfer agent include alkylmercaptans such as n-butylmercaptan, isobutylmercaptan, n-octylmercaptan, n-dodecylmercaptan, sec-butylmercaptan, sec-dodecylmercaptan, and t-butylmercaptan; aromatic mercaptans such as phenylmercaptan, thiocresol, and 4-t-butyl-o-thiocresol; thioglycolate esters such as 2-ethylhexyl thioglycolate and ethyl thioglycolate; mercaptans having 3 to 18 carbon atoms such as ethylene thioglycol; aromatic hydrocarbon-based chain transfer agents such as α-methylstyrene dimer, toluene, and ethylbenzene; and carbon tetrachloride. The alkylmercaptan may be any of primary, secondary and tertiary alkylmercaptans, and may have a substituted alkyl group. These alkylmercaptans may be used alone or in combination. Among these, an aromatic hydrocarbon-based chain transfer agents and mercaptans having an alkyl group of 4 to 12 carbon atoms are preferably used. Specific examples thereof include aromatic hydrocarbon-based chain transfer agents such as α-methylstyrene dimer and toluene; and alkylmercaptans having 4 to 12 carbon atoms, such as t-butylmercaptan, n-butylmercaptan, n-octylmercaptan, and n-dodecylmercaptan.

In the present invention, the amount of the chain transfer agent to be used is preferably from 0.01 to 20% by weight, more preferably from 0.01 to 5% by weight, and particularly preferably from 0.05 to 3% by weight, based on 100% by weight of the ethylenically unsaturated compound. When the amount is less than 0.01% by weight, the effect of the chain transfer agent deteriorates. In contrast, when the amount is more than 5% by weight, mechanical properties such as the strength and elastic modulus of the resulting polymer deteriorate.

In the present invention, the radical polymerization inhibitor means a compound which has high reactivity with a radical in a radical polymerization reaction system, and reacts with the radical to produce an inert product. The radical polymerization inhibitor is preferably a compound having aromatic ring and at least one hydroxyl group.

Examples of the radical polymerization inhibitor include hydroquinone, hydroquinone monomethyl ether, topanol A, catechol, t-butyl catechol, 2,6-di-t-butyl-4-methylphenol, phenothiazine, α-tocopherol, pentaerythrityl-tetrakis[3-(3,5-di-t-butyl-4-hydroxyphenyl)propionate], N,N'-hexamethylenebis(3,5-di-t-butyl-4-hydroxy-hydrocinnamamide, and bis(1,2,2,6,6-pentamethyl-4-piperidyl) 2-(3,5-di-t-butyl-4-hydroxybenzyl)-2-n-butylmalonate. It is possible to use compounds selected from these radical polymerization inhibitors alone or in combination.

In the present invention, the amount of the radical polymerization inhibitor is preferably from 0.001 to 0.5% by weight, and more preferably from 0.001 to 0.3% by weight, based on 100% by weight of the ethylenically unsaturated compound.

The ethylenically unsaturated compound in the present invention means a compound having a radical polymerizable carbon-carbon double bond. Specific examples thereof include methacrylate esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, isodecyl methacrylate, n-lauryl methacrylate, tridecyl methacrylate, n-stearyl methacrylate, 2-hydroxyethyl methacrylate, 2-hydroxypropyl methacrylate, 2-hydroxybutyl methacrylate, dimethylaminomethyl methacrylate, dimethylaminoethyl methacrylate, diethylaminoethyl methacrylate, methacrylic acid, glycidyl methacrylate, tetrahydrofurfuryl methacrylate, cyclohexyl methacrylate, benzyl methacrylate, 2-phenoxyethyl methacrylate, isobornyl methacrylate, polyethylene glycol monomethacrylate, and polypropylene glycol monomethacrylate; acrylate esters such as methyl acrylate, isoamyl acrylate, lauryl acrylate, stearyl acrylate, phenoxyethyl acrylate, tetrahydrofurfuryl acrylate, isobornyl acrylate, 2-hydroxyethyl acrylate, and 2-hydroxypropyl acrylate; monotunctional ethylenically unsaturated compounds such as acrylonitrile, methacrylonitrile, styrene, α-methylstyrene, hydroxystyrene, and α-methylstyrene dimer; and polyfunctional ethylenically unsaturated compounds such as ethylene glycol dimethacrylate, trimethylolpropane trimethacrylate, neopentyl glycol diacrylate, 3-methyl-1,5-pentanediol diacrylate, 1,6-hexanediol diacrylate, 2-butyl-2-ethyl-1,3-propanediol diacrylate, 1,9-nonane diacrylate, dimethyloltricyclodecane diacrylate, trimethylolpropane triacrylate, and pentaerythritol tetraacrylate. These ethylenically unsaturated compounds can be used alone or in combination.

Among these ethylenically unsaturated compounds, a compound selected from methyl methacrylate, ethyl methacrylate, i-propyl methacrylate and t-butyl methacrylate is preferred from the viewpoint of ease of formation of closed cells, good impregnating properties of the monomer, and high hardness and good flattening properties of the resulting interpenetrating polymer network structure.

The radical polymerization initiator in the present invention means a compound which is decomposed upon heating, irradiation with light or irradiation with radiation to produce a radical. Examples of the radical polymerization initiator include azo compounds and peroxides. Specific examples thereof include azo-based polymerization initiators such as 2,2'-azobisisobutyronitrile, 2,2'-azobis(2-methylbutyronitrile), 2,2'-azobis(2,4-dimethylvaleronitrile), 4,4'-azobis(4-cyanovaleric acid), 1,1'-azobis(cyclohexane-1-carbonitrile), and 2,2'-azobis(4-methoxy-2,4-dimethylvaleronitrile); and peroxide-based polymerization initiators such as cumen hydroperoxide, t-butyl hydroperoxide, dicumyl peroxide, di-t-butyl peroxide, t-butylperoxy-2-ethyl hexanoate, t-butylperoxy isobutylate, t-butylperoxy pivalate, t-butylperoxy benzoate, t-butylperoxy acetate, diisopropylperoxy dicarbonate, di-s-butylperoxy dicarbonate, benzoyl peroxide, acetyl peroxide, and lauroyl peroxide. The amount of the radical polymerization initiator to be added is preferably from 0.01 to 5% by weight, and more preferably from 0.05 to 3% by weight, based on 100% by weight of the ethylenically unsaturated compound.

In the present invention, the organic solvent is an organic compound which does not substantially react during polymerization of the ethylenically unsaturated compound and is liquid at a normal temperature. Specific examples thereof include hexane, dimethylformamide, dimethyl sulfoxide, ethanol, and methanol. The expression "substantially containing no organic solvent" means that the amount of the organic solvent is less than 1% by weight based on 100% by weight of the ethylenically unsaturated compound in the radical polymerizable composition. Carbon tetrachloride, toluene and ethylbenzene are usually known as the organic solvent. These compounds do not correspond to the organic solvent as used herein since the effect as a chain transfer agent is known.

In the present invention, the radical polymerizable composition means a composition containing the above-mentioned ethylenically unsaturated compound and the above-mentioned radical polymerization initiator. Furthermore, antioxidants, age resistors, fillers, colorants, mildewproofing agents, antimicrobial agents, flame retardants and ultraviolet absorbers may be added in the radical polymerizable composition. These compounds are preferably used in the amount of 3% by weight or less in total based on 100% by weight of the ethylenically unsaturated compound.

The radical polymerizable composition is preferably a composition which does not substantially contain the organic solvent from the economical point of view of necessity of the step of removing an organic solvent.

In the present invention, the polymer molding means a solid polymer substance at a normal temperature. The molding may have a solid, hollow, or foam shape. Although properties of the molding are not particularly limited, it is necessary that the radical polymerizable composition is incorporated by impregnating the molding with the composition as a result of immersion in the composition. Therefore, it is necessary that the molding is composed of the material having affinity with the radical polymerizable composition and also has flexibility which enables swelling of the polymer molding by incorporation of the radical polymerizable composition. Although it varies depending on the density or impregnating amount of the radical polymerizable composition, the volume of the polymer molding after impregnation is about 1.03 to 5 times, and usually about 1.03 to 3 times, larger than the original volume as a result of the swelling.

Such a polymer molding is preferably composed of a polymer containing a polyethylene glycol chain, a polypropylene glycol chain or a polytetramethylene glycol chain. Specific examples thereof include polyester and polyurethane.

The form of the polymer molding is preferably a foam containing closed cells each having an average cell diameter of 10 to 230 $\mu$m, more preferably 10 to 120 $\mu$m, and particularly preferably 20 to 60 $\mu$m. The surface or slice surface of the polymer molding was observed by a scanning electron microscope (SEM) at a magnification of 200 times and images were analyzed by an image processor, whereby, all cell diameters in the images were measured and a number-average of them was taken as an average cell diameter.

The apparent density of the polymer molding is preferably from 0.1 to 1.2 g/cm$^3$, and more preferably from 0.5 to 1.0 g/cm$^3$. The apparent density can be measured by the method described in Japanese Industrial Standard JIS K 7112. Furthermore, it is preferred that the radical polymerizable composition incorporated into the polymer molding does not penetrate into cells in the polymer molding and the cells of the polymer molding are remained as the cells even after the ethylenically unsaturated compound is polymerized in a swollen state of the polymer molding. The apparent density of the resulting polishing pad is preferably from 0.2 to 1.1 g/cm$^3$, and more preferably from 0.6 to 1.1 g/cm$^3$.

The polymer molding of the present invention is preferably composed of polyurethane and is particularly preferably a polyurethane molding obtained by mixing two solutions of polyol and polyisocyanate. As used herein, the polyol means a compound having two or more hydroxyl groups. The polyol includes, for example, polyol selected from polyetherpolyol, polyesterpolyol, polycarbonatepolyol, polycaprolactonepolyol, ethylene glycol, propylene glycol and glycerin, or a mixture of two or more kinds of them.

Examples of the polyisocyanate include aromatic isocyanates such as tolylene diisocyanate (TDI), diphenylmethane diisocyanate (MDI), polymeric MDI, and naphthalene diisocyanate; aliphatic diisocyanates such as tetramethylene diisocyanate, and hexamethylene diisocyanate; and alicyclic diisocyanates such as isophorone diisocyanate, hydrogenated TDI, and hydrogenated MDI. It is possible to use isocyanate selected from these isocyanates, or a mixture of two or more kinds of them.

Upon preparation of the polymer molding, the polymer molding may contain, in addition to polyol and polyisocyanate, crosslinking agents, chain extenders, foam stabilizers, blowing agents, resinifying catalysts, foaming catalysts, antioxidants, age resistors, fillers, plasticizers, colorants, mildewproofing agents, antimicrobial agents, flame retardants, and ultraviolet absorbers.

Although the process for preparing a polymer molding is not particularly limited, methods such as injection molding and reaction molding methods can be used. In the preparation of the polyurethane molding, the polyurethane molding is preferably obtained by a molding for slab molding method using a high-pressure injector for instantly mixing raw materials by collision in a mixing head, or a so-called low-pressure injector for mechanically mixing raw materials fed in a mixing head using a stirring blade.

The process for producing an interpenetrating polymer network structure will be described below. The interpenetrating polymer network structure can be produced through the steps of impregnating the above-mentioned polymer molding with the above-mentioned radical polymerizable composition containing an ethylenically unsaturated compound and a radical polymerization initiator; and polymerizing the ethylenically unsaturated compound in a swollen state of the polymer molding impregnated with the radical polymerizable composition. In the process for producing an interpenetrating polymer network structure of the present invention, before the step of impregnating the polymer molding with the radical polymerizable composition, a chain transfer agent and/or a radical polymerization inhibitor are added to the radical polymerizable composition and/or the polymer molding.

It is a feature of the present invention that a chain transfer agent and/or a radical polymerization inhibitor are allowed to exist in the system in the steps of impregnating the polymer molding with the radical polymerizable composition and polymerizing the ethylenically unsaturated compound. The interpenetrating polymer network structure obtained by this method displays excellent mechanical uniformity in mechanical properties such as tensile strength and tensile elongation. Furthermore, when the interpenetrating polymer network structure is used as the polishing pad, the step of CMP polishing becomes stable because of high in-plane uniformity of a polishing rate during polishing, excellent flattening properties, improved pad lifetime and small difference in properties between polishing pads.

The reason is not clear, but is thought to be as follows. When the chain transfer agent is added during the production, since quick heat generation upon the polymerization reaction is not observed, and also the temperature in the reaction system is almost constant over time and the polymerization reaction stably proceeds, the chemical composition and properties of the resulting interpenetrating polymer network structure are uniform. Therefore, the polishing pad produced from the polymer network structure exhibits stable properties in the plane of the polishing pad and between a plurality of polishing pads. The chain transfer agent is particularly effective for making the chemical composition and properties in the thickness direction uniform in the production of the interpenetrating polymer network structure. Therefore, it is particularly preferred to make chemical composition and properties uniform in a plurality of polishing pads when the interpenetrating polymer network structure is sliced to produce a polishing pad.

It is estimated that, when a radical polymerization inhibitor is added to produce a polishing pad, the initiation time of the polymerization reaction is unified in the entire reaction system and the process from the initiation to the completion of the polymerization reaction become almost the same in the entire reaction system, thus obtaining an interpenetrating polymer network structure and a polishing pad in which the resulting cured article shows small variation in properties and high uniformity. The radical polymerization inhibitor is particularly effective to make the in-plane direction chemical composition and properties uniform in the production of the interpenetrating polymer network structure. Therefore, it is particularly preferred to make the in-plane direction chemical composition and properties uniform in the resulting polishing pad.

As described above, the radical polymerizable composition is preferably a composition which does not substantially contain an organic solvent from the economical point of view of necessity of the step of removing an organic solvent. However, in a conventional production method, when the radical polymerizable composition does not contain an organic solvent, the polymerization reaction initiates and viscosity increase while the polymer molding is impregnating with the radical polymerizable composition. Therefore there was a problem that the impregnation rate to the polymer molding decreases and the time required for the reduction increases. In the present invention, when a chain transfer agent and/or a radical polymerization inhibitor are allowed to coexist in the step of impregnating the polymer molding with the radical polymerizable composition, an increase in viscosity of the composition can be prevented. Thus, it became possible to use the radical polymerizable composition which does not substantially contain the organic solvent, the step of removing the organic solvent becomes unnecessary, resulting in decreased production hour and production step, and an increase in production efficiency.

Although only any one of the chain transfer agent and the radical polymerization inhibitor may be added, more preferably both are added since a synergistic effect is exerted.

The chain transfer agent and/or radical polymerization inhibitor may be added to the polymer molding, or added in the radical polymerizable composition. Also, a chain transfer agent and/or radical polymerization inhibitor may be added to the polymer molding and also may be blended in the radical polymerizable composition. When the chain transfer agent and/or radical polymerization inhibitor are used for both of the radical polymerizable composition and polymer molding, the same or different compound may be used for both.

When using the radical polymerization inhibitor, impregnation and/or polymerization of the radical polymerizable composition are preferably performed in the presence of an oxygen gas or an oxygen-containing gas for the purpose of enhancing a polymerization inhibitory effect. In this case, examples of preferred radical polymerization inhibitors include phenothiazine, hydroquinone, hydroquinone monomethyl ether, t-butyl catechol, and topanol A. As the oxygen-containing gas, air, oxygen and a gas prepared by diluting them with an inert gas are used. Examples of the inert gas include nitrogen, helium, and argon. When diluted, the oxygen concentration is not particularly limited and is preferably 1% by volume or more. The oxygen-containing gas to be used is preferably dry air, or a gas prepared by diluting dry air with nitrogen in view of cheapness.

The chain transfer agent and/or radical polymerization inhibitor preferably exists in the reaction system in a uniform concentration since it controls the manner in which the radical polymerization reaction proceeds.

One of the methods of uniformly distributing these chain transfer agent and/or radical polymerization inhibitors in the reaction system includes, for example, a method of adding the raw material in the preparation of the polymer molding. For example, in the preparation of the polymer molding of polyurethane, a chain transfer agent and/or a radical polymerization inhibitor are mixed with polyol as a raw material of polyurethane, and then the polyol and polyisocyanate are subjected to reactive injection molding using a reactive injection molding (RIM) method, thus making it possible to obtain a polyurethane polymer molding in which the chain transfer agent and/or radical polymerization inhibitor are distributed in a uniform concentration. Subsequently, the polymer molding is impregnated with a radical polymerizable composition and the radical polymerizable composition is polymerized to obtain an interpenetrating polymer network structure having a chemically uniform composition, comprising a polyurethane and an ethylenically unsaturated compound polymer.

When the chain transfer agent is mixed in the preparation the polymer molding, the content of the chain transfer agent is preferably from 0.01 to 20% by weight, more preferably from 0.01 to 5% by weight, and still more preferably from 0.05 to 3% by weight, based on 100% by weight of the polymer molding. When the content is less than 0.01% by weight, the effect of the chain transfer agent is not exerted sometimes. In contrast, when the content is more than 20% by weight, mechanical properties such as strength and elastic modulus may deteriorate.

The content of the chain transfer agent in the polymer molding can be measured by quantitative analysis of a solution prepared by grinding a polymer molding, followed by Soxhlet extraction with chloroform using gas chromatography.

Examples of another method of uniformly distributing these chain transfer agents and/or radical polymerization inhibitors in the reaction system include a method of adding a chain transfer agent and/or radical polymerization inhibitor of a comparatively low molecular weight in the radical polymerizable composition. Chain transfer agents and/or radical polymerization inhibitors with a large molecular weight are not uniformly distributed in the polymer molding since a diffusion rate in case of impregnation with the polymer molding is low. In contrast, chain transfer agents and/or radical polymerization inhibitors with a comparatively low molecular weight are distributed in the polymer molding in a uniform concentration since a diffusion rate in case of impregnation with the polymer molding is high. Therefore, the resulting interpenetrating polymer network structure becomes chemically homogeneous. As the chain transfer agent and radical polymerization inhibitor, for example, a compound having a molecular weight of 350 or less is preferably used. Examples of the chain transfer agent having a molecular weight of 350 or less include aromatic hydrocarbons having a molecular weight of 350 or less, such as α-methylstyrene dimer, ethylbenzene, and toluene; and mercaptan having an alkyl group of 4 to 12 carbon atoms, such as t-butylmercaptan, n-butylmercaptan, no octylmercaptan, and n-dodecylmercaptan. Examples of the radical polymerization inhibitor having a molecular weight 350 or less include hydroquinone, hydroquinonemono methyl ether, catechol, t-butyl catechol, t-butyl pyrocatechol, 2,6-di-t-butyl-4-methylphenol, and 2-t-butyl-4,6-dimethylphenol.

In the interpenetrating polymer network structure, a weight ratio of the polymer molding to the polymer obtained by polymerizing from the ethylenically unsaturated compound is preferably from 100/5 to 100/300, and more preferably from 100/50 to 100/200. When the weight ratio is less than 100/5, properties are nearly the same as those in the case of the polymer molding alone. In contrast, when the weight ratio is more than 100/300, the time required to impregnate the polymer molding with the radical polymerizable composition becomes too long, and therefore it is not preferred.

The step of immersing the polymer molding in the radical polymerizable composition is preferably performed at a temperature of 15 to 60° C. for 3 hours to 20 days, and preferably 3 hours to 10 days.

Using the interpenetrating polymer network structure obtained by the above-mentioned method, a polishing pad is produced. The polishing pad is produced by forming the interpenetrating polymer network structure into a predetermine shape and a predetermined thickness and optionally forming grooves on the surface.

The thickness of the polishing pad is preferably 1 mm or more. The thickness of the polishing pad is preferably 5 mm or less. Regarding the size of the polishing pad, the diameter is preferably 300 mm or more. Regarding the size of the polishing pad, the diameter is preferably 2 m or less. When the thickness of the polishing pad is less than mm and the diameter is less than 300 mm, polishing pad lifetime may decrease. In contrast, when the thickness of the polishing pad is more than 5 mm and the diameter of the polishing pad is more than 2 m, it is difficult to replace the polishing pad and it may become impossible to uniformly apply to a polishing surface table.

As described above, when using the production method of the present invention, a uniform polishing pad having small variation in a chemical composition can be obtained. One aspect of the polishing pad of the present invention is a polishing pad comprising an interpenetrating polymer network structure containing a polymer molding and a polymer of an ethylenically unsaturated compound, the polishing pad having a thickness of 1 mm or more and a diameter 300 mm or more, wherein a weight ratio of the polymer molding at any position of the polishing pad is within a range of $X\pm 3(\%)$ where $X$ (%) denotes an average weight ratio of the polymer molding based on the total weight of the polymer molding and the ethylenically unsaturated compound polymer. As described in the Examples, the composition at each position of the polishing pad is measured and a weight ratio of the weight of the polymer molding to the total weight of the polymer molding and the ethylenically unsaturated compound polymer is determined and the average is taken as $X$ (%). A measured minimum value in the weight ratio of the polymer molding is $X-3(\%)$ or more and a maximum value is $X+3(\%)$ or less. A weight ratio of an ethylenically unsaturated compound polymer at any position of the polishing pad is within a range of $(100-X)\pm 3(\%)$.

The weight ratio of the polymer molding to the ethylenically unsaturated compound polymer is obtained by measuring an infrared absorption spectrum. The weight ratio of the polymer molding to the ethylenically unsaturated compound polymer can be calculated by a ratio of an absorbance of absorption peculiar to the polymer molding to an absorbance of absorption peculiar to the ethylenically unsaturated compound polymer. Since an aperture diameter varies depending on the measuring method, the size for obtaining a spectrum varies. For example, according to a conventional infrared spectroscopy, the aperture diameter is about 1 mm and a weight ratio of both polymers with respect to the region of 1 mm order is obtained. When using infrared microspectrometry, the aperture diameter is about 100 μm and a weight ratio of both polymers with respect to the region of 100 mm order is obtained. When using Raman microspectrometry, a weight ratio of both polymers with respect to the region of 1 μm order is obtained. In the interpenetrating polymer network structure of the present invention, since the polymer molding and the ethylenically unsaturated compound polymer are mixed very finely and the weight ratio of both is uniform in the region of about 1 μm to about 1 mm order, the same results are obtained when measured using any method.

The polishing pad of the present invention preferably has a tensile breaking strength of 13 MPa or more. The polishing pad of the present invention preferably has a tensile breaking elongation of 150% or more. The tensile breaking strength and tensile breaking elongation are values obtained by performing a tensile test at an environment of 23° C. and 50% RH according to JIS K 7113:1995 under the conditions of a distance between chucks of 58 mm and a test speed of 50 mm/minute using a No. 1 small-sized specimen (thickness of specimen: 1 to 2 mm). When the tensile breaking strength is less than 13 MPa, polishing properties such as in-plane uniformity of a polishing rate during polishing and lifetime deteriorate. When the tensile breaking elongation is less than 150%, polishing properties such as in-plane uniformity of a polishing rate during polishing and lifetime deteriorate. The tensile breaking strength is preferably 50 MPa or less. When the tensile breaking strength is more than 50 MPa, the pad tends to become brittle. The tensile breaking elongation is preferably 1,000% or more. When the tensile breaking elongation is more than 1,000%, the elasticity of the pad becomes too strong.

The polishing pad of the present invention preferably contains closed cells each having an average cell diameter of 10 to 230 μm. The average cell diameter is preferably from 10 to 120 μm, and particularly preferably from 20 to 60 μm. The surface or slice surface of the polishing pad was observed by a scanning electron microscope (SEM) at a magnification of 200 times and images were analyzed by an image processor, whereby, all cell diameters in the images were measured and a number-average of them was taken as an average cell diameter. On the surface of the polishing pad, flat surfaces and openings derived from cells preferably exist in a proper ratio. The number of cells on an optional slice surface is preferably from 10 to 1,000 cells/mm$^2$, and more preferably from 200 to 600 cells/mm$^2$.

Apparent density of the polishing pad of the present invention is preferably from 0.2 to 1.1 g/cm$^3$. The apparent density is a value measured by Harvard type picometer using purified water as a medium and can be measured by the method described in Japanese Industrial Standard JIS K 7112. When the apparent density is less than 0.2, local smoothness may become poor in polishing properties and global level difference may increase. When the density is more than 1.1, scratch may occur in polishing properties. The apparent density is more preferably within a range from 0.4 to 0.9, and still more preferably from 0.45 to 0.85.

The polishing pad of the present invention can be used for polishing semiconductor substrates such as silicone wafers; optical member such as lens; and electronic materials such as magnetic heads and hard disks. Particularly, the polishing pad of the present invention can be used as a polishing pad for a polishing treatment of semiconductor wafers as materials to be polished for the purpose of flattening semiconductor wafers using a chemical mechanical polishing (CMP) technique. In the CMP step, the polishing pad is used for the purpose of polishing a semiconductor wafer surface by performing relative motion of a semiconductor wafer and a polishing pad using a polishing slurry comprising a polishing agent and a chemical solution, thereby flattening and smoothing the semiconductor wafer surface.

The polishing pad of the present invention can also be used for polishing optical members such as optical lens, optical prisms, optical filters, and light guides. Examples of materials of optical members as subjects to be polished include glass, quartz, quartz crystals, sapphires, transparent resins, lithium tantalate, and lithium niobate.

Examples of other applications include applications in which gallium arsenide, gallium phosphorus, indium phosphorus, ferrite, alumina, silicon carbide, silicon nitride, ceramics, alloys, and resin as subjects are polished

EXAMPLES

The present invention will now be described in detail by way of Examples, but the present invention is not limited thereto. Evaluations were performed by the following procedures.

[Average Cell Diameter]

The surface or slice surface of samples was observed by a scanning electron microscope "SEM2400" (Hitachi, Ltd.) at a magnification of 200 times and images were analyzed by an image processor, whereby, all cell diameters in the images were measured and an average of them was taken as an average cell diameter.

[Apparent Density]

Apparent density was measured according to the method described in JIS K 7112 using a picometer (Harvard type).

[Tensile Test]

Using a tensile testing machine RTM-100 (manufactured by ORIENTEC Co., Ltd.), a breaking strength and a breaking elongation were measured under the following measuring conditions. An average of 5 specimens was taken as a measured value.

Test room temperature: 23° C.
Humidity of test room: 50%
Shape of specimen: No. 1 small-sized specimen described in JIS K 7113:1995
Thickness of specimen: 1 to 2 mm
Distance between chucks: 58 mm
Test speed: 50 mm/minute

[Measurement of Weight Ratio of Polyurethane and Polymethyl Methacrylate]

A sheet to be measured was cut into pieces measuring 600 mm×600 mm and then finely cut into 400 pieces measuring 30 mm×30 mm. In the center of each piece, an infrared absorption spectrum was measured by the following procedure and a weight ratio of polyurethane to polymethyl methacrylate was calculated from an absorbance ratio of absorptions derived from polyurethane and polymethyl methacrylate. With respect to 400 pieces, a weight ratio of polyurethane based on the total weight of polyurethane and polymethyl methacrylate was determined, and then the average X, the minimum value and the maximum value were determined.

Device: Fourier transform infrared absorption spectrometer "AVATAR360" (manufactured by Nicolet Co.)
Attachment: horizontally installed one-reflection ATR measuring device "OMNI-samoler" ATR crystal: Ge, incidence angle: 45°
Measuring conditions: number of scanning times: 32 times, resolving power: 4 cm$^{-1}$
Measuring position: Surface center, front surface and back surface of a specimen measuring 3 cm×3 cm×2 mm in thickness
Analysis method: Absorption at 1105 m$^{-1}$ was used as absorption derived from polyurethane. Absorption at 1150 m$^{-1}$ was used as absorption derived from polymethyl methacrylate. A weight ratio PU:PMMA of polyurethane and polymethyl methacrylate (hereinafter referred to as PMMA) was calculated from an absorbance ratio ABS (PU):ABS (PMMA) of two absorptions. In the calculation, analysis software "OMNIC E.S.P. 5.1" attached to the device was used. Regarding data processing of spectrum, the following procedure was carried out: (1) auto base line collection, (2) auto-smoothing, (3) Y axis normalization, and (4) peak detection

[Evaluation of Polishing]

Using "Suba400" (manufactured by Rodel Nitta Corporation) as a cushion layer, a polishing pad to be evaluated was applied using a double faced adhesive tape to produce a laminated polishing pad. The laminated polishing pad was applied on a surface table of a polishing device and, after pressing a diamond conditioner against the laminated polishing pad under a pressure of 0.05 MPa, the polishing surface table was rotated at a rotational speed of 32 rpm and the conditioner was rotated an a rotational speed of 30 rpm in the same direction. While feeding purified water on the polishing pad at a rate of 100 mL/minute, conditioning of the polishing pad was performed for 5 minutes.

A 6 inch silicone wafer for evaluation was mounted to a polishing head of a polishing device and then rotated at 40 rpm. The laminated polishing pad was fixed on the polishing surface table of the polishing device and then rotated at the same rotation direction as that of the polishing head at 40 rpm. While feeding a silica-based slurry at a rate of 180 mL/minute, polishing was performed under a polishing pressure of 0.06 MPa for one minute and a polishing rate of an oxide film of the silicone wafer surface was measured. After polishing, while feeding purified water immediately after polishing so as not to dry the wafer surface, the wafer surface was washed using a polyvinyl alcohol sponge and then dried by spraying dry compressed air.

Twenty wafers for evaluation were polished and the 20th oxide film polishing rate was measured. After continuously polishing, the 500th oxide film polishing rate was measured.

[Polishing Rate]

By measuring a wafer thickness before and after polishing using a light interference type thickness measurement system "Lambda Ace" VM-8000J (manufactured by DAINIPPON SCREEN MFG. CO., LTD.), a polishing amount (a polishing rate) per unit hour was calculated. A test wafer for evaluation in which a thermal oxide film having a thickness of about 1.2 µm is formed on a 6 inch silicone wafer was used.

[In-Plane Uniformity]

A polishing rate was measured at 49 points of a wafer in a diameter direction and then in-plane uniformity (%) was calculated by multiplying a value, which is obtained by dividing a difference between a maximum value and a minimum value by 2 times an average at 49 points, by 100

In-Plane Uniformity (%)=(Maximum−Minimum)× 100/2×Average

[Flattening Properties]

Forty wafers for evaluation were polished and then polished using an oxide film wafer with a repeating pattern having a pattern height of 0.60 µm and a line & space having a line of 300 µm and a space of 30 µm, polishing was performed by the above procedure. During polishing for 30, 60, 90, 120, 150 and 180 seconds, the measurement was performed and the time required for a level difference to be decreased to 0.10 µm as a result of flattening was determined.

Comparative Example 1

In a first raw material tank and a second raw material tank of an RIM molding machine, the following raw material compositions were charged and, after loading a nitrogen gas in the first raw material tank, the raw material compositions were poured into a die and then cured to obtain a polyurethane molding measuring 850 mm×850 mm and 12 mm in thickness. The resulting polyurethane molding had an apparent density of 0.82 g/cm$^3$ and closed cells having an average cell diameter of 28 µm were observed.

| <First Raw Material Tank> | |
|---|---|
| Polypropylene glycol | 85 parts by weight |
| Diethylene glycol | 15 parts by weight |
| Tin octylate | 0.5 part by weight |

-continued

| | |
|---|---|
| Silicone-based foam stabilizer | 3 parts by weight |
| Purified water | 0.3 part by weight |
| <Second Raw Material Tank> | |
| Diphenylmethane diisocyanate | 120 parts by weight |

The following radical polymerizable composition was prepared and the above-mentioned polyurethane molding was immersed therein at 20° C. for 7 days. As a result, the polyurethane molding was impregnated with the entire amount of the radical polymerizable composition. A weight ratio of the polyurethane molding to the radical polymerizable composition was 100/150.

| | |
|---|---|
| Methyl methacrylate | 300 parts by weight |
| Azobisisobutyronitrile | 0.9 part by weight |

The polyurethane molding swollen by impregnation was interposed between two glass plates via a gasket made of vinyl chloride, followed by sealing by fixing the periphery. The radical polymerizable composition was cured by heating at 70° C. for 5 hours and heating in an oven at 100° C. for 3 hours to obtain an interpenetrating polymer network structure. The resultant interpenetrating polymer network structure was released from the glass plates and the weight was measured. Immediately after drying at 50° C. for 12 hours, 100° C. for 12 hours and then at a normal temperature for 12 hours, the weight was measured. As a result, a weight loss was not confirmed when compared with that before drying.

The center portion of the interpenetrating polymer network structure in the thickness direction was sliced and surface-ground to obtain a sheet having a thickness of 2 mm. No. 1 small-sized specimen was punched out from the sheet, and then a tensile breaking strength and a tensile breaking elongation were measured and found to be 11.6 MPa and 270%. Also a No. 1 small-sized specimen was punched out from the end portion of the sheet and then a tensile breaking strength and a tensile breaking elongation and found to be MPa and 240%.

With respect to a sheet having a thickness of 2 mm cut from the center portion in the thickness direction, a weight ratio of polyurethane to the sum of polyurethane and PMMA was calculated. As a result, the weight ratio of polyurethane in 400 pieces showed an average of 43.3%, a minimum value of 37.3% and a maximum value of 49.2%. A ratio of the polyurethane molding to the ethylenically unsaturated compound polymer was 100/130.9.

The sheet having a thickness of 2 mm cut from the center portion in the thickness direction was punched out to obtain a circle having a diameter of 600 mm and a lattice pattern-like groove measuring 1.5 mm in width, 0.5 mm in depth and 30 mm in pitch was formed on one surface to produce a polishing pad. The polishing pad had an apparent density of 0.85 g/cm³ and closed cells had an average cell diameter of 34 µm. Openings derived from cells (395 cells/mm²) were observed on the surface.

As a result of evaluation of polishing, the 1st and the 20th polishing rates were respectively 1,800 angstroms/minute and 1,850 angstroms/minute, and in-plane uniformities were respectively 15% and 16%. After polishing 500 samples, the polishing rate was 800 angstroms/minute and in-plane uniformity was 30%. With respect to flattening properties, flattening required polishing for 150 seconds.

Comparative Example 2

The ⅕ and ⅘ portions of the interpenetrating polymer network structure of Comparative Example 1 in the thickness direction were sliced and surface-ground to obtain sheets having a thickness of 2 mm. No. 1 small-sized specimen was punched out from the center portion of the sheet, and then a tensile breaking strength and a tensile breaking elongation were measured and found to be a tensile breaking strength 9.3 MPa and a tensile breaking elongation of 180%, and a tensile breaking strength of 8.9 MPa and a tensile breaking elongation of 190%.

In Comparative Example 1 and Comparative Example 2, there was confirmed a remarkable difference in the values of the tensile breaking strength and the tensile breaking elongation of the tensile test piece having a thickness of about 2 mm obtained from the same interpenetrating polymer network structure between the center and peripheral parts in the same sheet, and between the center sheet and the surface layer sheet in the thickness direction.

With respect to the sheet having a sheet having a thickness of 2 mm obtained from the ⅕ portion in the thickness direction, a weight ratio of polyurethane to the sum of polyurethane and PMMA was calculated. As a result, the weight ratio of polyurethane in 400 pieces showed an average of 36.4%, a minimum value of 30.6% and a maximum value of 42.4%. A ratio of the polyurethane molding to the ethylenically unsaturated compound polymer was 100/174.7.

As is apparent from the results of Comparative Example 1 and Comparative Example 2, both sheets showed an in-plane large distribution wide of the composition and also there was a large difference in composition between the center sheet and the surface layer sheet in the thickness direction.

Example 1

In the very same manner as in Comparative Example 1, except that the following composition was used in the first raw material tank and a chain transfer agent containing ethylbenzene in an amount of 10.2% by weight based on 100% by weight of polyurethane was used, an interpenetrating polymer network structure and a polishing pad were produced.

| <First Raw Material Tank> | |
|---|---|
| Polypropylene glycol | 85 parts by weight |
| Diethylene glycol | 15 parts by weight |
| Ethylbenzene | 25 parts by weight |
| Tin octylate | 0.5 part by weight |
| Silicone-based foam stabilizer | 3 parts by weight |
| Purified water | 0.3 part by weight |

The resulting polishing pad had an apparent density of 0.87 g/cm³, and closed cells had an average cell diameter of 35 µm. Openings derived from cells (400 cells/mm²) were observed on the surface. A tensile breaking strength and a tensile breaking elongation of a sheet having a thickness of 2 mm obtained from the center portion of the interpenetrating polymer network structure in the thickness direction were respectively 13.2 MPa and 270%.

As a result of evaluation of polishing, 1st and 20th polishing rates were respectively 1,820 angstroms/minute and 1,820 angstroms/minute, and in-plane uniformities were respectively 8% and 7%. After polishing 500 samples, the polishing rate was 1,810 angstroms/minute and in-plane uniformity was 8%. With respect to flattening properties, flattening required polishing for 120 seconds.

Example 2

In the very same manner as in Comparative Example 1, except that the following composition was used in the first raw material tank and a chain transfer agent containing a α-methylstyrene dimer in an amount of 2.9% by weight based on 100% by weight of polyurethane was used, an interpenetrating polymer network structure and a polishing pad were produced.

| <Second Raw Material Tank> | |
| --- | --- |
| Diphenylmethane diisocyanate | 120 parts by weight |
| α-methylstyrene dimer | 6.5 parts by weight |

The interpenetrating polymer network structure had an apparent density of 0.86 g/cm$^3$, and closed cells had an average cell diameter of 35 μm. Openings derived from cells (367 cells/mm$^2$) were observed on the surface. The tensile breaking strength and the tensile breaking elongation of the sheet having a thickness of 2 mm obtained from the center portion of the interpenetrating polymer network structure in the thickness direction were respectively 15.8 MPa and 315%.

With respect to the above-mentioned sheet, a weight ratio of polyurethane to the sum of polyurethane and PMMA was calculated. As a result, the weight ratio of polyurethane in 400 pieces showed an average of 40.3%, a minimum value of 38.1% and a maximum value of 42.3%. A ratio of the polyurethane molding to the ethylenically unsaturated compound polymer was 100/148.1.

As a result of evaluation of polishing, 1st and 20th polishing rates were respectively 1,860 angstroms/minute and 1,890 angstroms/minute, and in-plane uniformities were respectively 7% and 8%. After polishing 500 samples, the polishing rate was 1,810 angstroms/minute and in-plane uniformity was 7%. With respect to flattening properties, flattening required polishing for 120 seconds.

Example 3

The ⅕ and ⅘ portions of the interpenetrating polymer network structure of Comparative Example 2 in the thickness direction were sliced and surface-ground to obtain sheets having a thickness of 2 mm. No. 1 small-sized specimen was punched out from the center portion of the sheet, and then a tensile breaking strength and a tensile breaking elongation were measured and found to be a tensile breaking strength 15.7 MPa and a tensile breaking elongation of 314%, and a tensile breaking strength of 15.6 MPa and a tensile breaking elongation of 310%.

With respect to a sheet having a thickness of 2 mm cut from the center portion in the thickness direction, a weight ratio of polyurethane to the sum of polyurethane and PMMA was calculated. As a result, the weight ratio of polyurethane in 400 pieces showed an average of 39.6%, a minimum value of 37.6% and a maximum value of 41.7%. A ratio of the polyurethane molding to the ethylenically unsaturated compound polymer was 100/152.5.

In Example 2 and Example 3, there was a small difference in the values of the tensile breaking strength and tensile breaking elongation of the tensile test piece having a thickness about 2 mm obtained from the same interpenetrating polymer network structure in and between sheets. Also, there is a small difference in an average of the weight ratio of polyurethane between the center sheet and the surface layer sheet in the thickness direction. As is apparent from the results, there is exerted the effect of decreasing distribution of the composition in the thickness direction by adding a chain transfer agent.

Example 4

In the very same manner as in Comparative Example 1, except that the following composition was used in the first raw material tank, a polyurethane molding, which contains, as a chain transfer agent, a α-methylstyrene dimer in the amount of 0.09% by weight based on 100% by weight of polyurethane and also contains closed cells having an apparent density of 0.31 g/cm$^3$ and an average cell diameter of 80 μm, was produced.

| <First Raw Material Tank> | |
| --- | --- |
| Polypropylene glycol | 85 parts by weight |
| Diethylene glycol | 15 parts by weight |
| α-methylstyrene dimer | 0.2 part by weight |
| Tin octylate | 0.5 part by weight |
| Silicone-based foam stabilizer | 3 parts by weight |
| Purified water | 0.3 part by weight |

The following radical polymerizable composition was prepared and the above-mentioned polyurethane molding was immersed therein at 20° C. for 24 hours. As a result, the polyurethane molding was impregnated with the entire amount of the radical polymerizable composition. A weight ratio of the polyurethane molding to the radical polymerizable composition was 100/30.

| Methyl methacrylate | 300 parts by weight |
| --- | --- |
| Azobis(2-methylbutyronitrile) | 1.5 parts by weight |

The polyurethane molding swollen by impregnation was interposed between two glass plates via a gasket made of vinyl chloride, followed by sealing by fixing the periphery. The radical polymerizable composition was cured by heating at 70° C. for 5 hours and heating in an oven at 100° C. for 3 hours to obtain an interpenetrating polymer network structure.

The center portion of the resulting interpenetrating polymer network structure in the thickness direction was sliced and surface-ground to obtain a sheet having a thickness of 2 mm.

The above-mentioned sheet was punched out to obtain a circle having a diameter of 600 mm and a lattice pattern-like groove measuring 1.0 mm in width, 0.5 mm in depth and 18 mm in pitch was formed on one surface to produce a polishing pad. The polishing pad had an apparent density of 0.32 g/cm$^3$, and closed cells had an average cell diameter of 85 μm. Openings derived from cells (76 cells/mm$^2$) were observed on the surface.

As a result of evaluation of polishing, the 1st and the 20th polishing rates were respectively 1,220 angstroms/minute and 1,240 angstroms/minute, and in-plane uniformities were respectively 9% and 10%. After polishing 500 samples, the polishing rate was 1,220 angstroms/minute and in-plane uniformity was 9%.

Example 5

In the very same manner as in Comparative Example 1, except that the following composition was used as the radical polymerizable composition, an interpenetrating polymer network structure and a polishing pad were produced.

| | |
|---|---|
| Methyl methacrylate | 300 parts by weight |
| Azobisisobutyronitrile | 0.9 part by weight |
| n-octylmercaptan | 0.9 part by weight |

The resulting polishing pad had an apparent density of 0.88 g/cm$^3$, and closed cells had an average cell diameter of 34 μm. Openings derived from cells (390 cells/mm$^2$) were observed on the surface. A tensile breaking strength and a tensile breaking elongation of a sheet having a thickness of 2 mm obtained from the center portion of the interpenetrating polymer network structure in the thickness direction were respectively 16.0 MPa and 310%.

As a result of evaluation of polishing, the 1st and 20th polishing rates were respectively 1,900 angstroms/minute and 1,900 angstroms/minute, and in-plane uniformities were respectively 7% and 8%. After polishing 500 samples, the polishing rate was 1,850 angstroms/minute and in-plane uniformity was 8%. With respect to flattening properties, flattening required polishing for 120 seconds.

Example 6

In the very same manner as in Comparative Example 1, except that the following composition was used as the radical polymerizable composition, an interpenetrating polymer network structure and a polishing pad were produced.

| | | |
|---|---|---|
| Methyl methacrylate | 300 | parts by weight |
| Azobisisobutyronitrile | 0.9 | part by weight |
| α-methylstyrene dimer | 1.2 | parts by weight |
| Hydroquinone monomethyl ether | 0.06 | part by weight |

The resulting polishing pad had an apparent density of 0.86 g/cm$^3$, and closed cells had an average cell diameter of 34 μm. Openings derived from cells (391 cells/mm$^2$) were observed on the surface.

The measurement of a relaxation time of an interpenetrating polymer network structure by a solid NMR (nuclear magnetic resonance) method revealed that a structure in which PMMA is dispersed in several tens of nanometers in a polyurethane molding and two polymer chains of polyurethane and PMMA are mutually penetrated to cause entanglement of polymer chains. Namely, the fact that the relaxation time of the interpenetrating polymer network structure is longer than that of the polyurethane molding alone and that of the methyl methacrylate polymer alone, revealed that the interpenetrating polymer network structure is formed.

The center portion of the interpenetrating polymer network structure in the thickness direction was sliced and surface-ground to obtain a sheet having a thickness of 2 mm. No. 1 small-sized specimen was punched out from the sheet, and then a tensile breaking strength and a tensile breaking elongation were measured and found to be 15.5 MPa and 320%.

With respect to the above-mentioned sheet, a weight ratio of polyurethane to the sum of polyurethane and PMMA was calculated. As a result, the weight ratio of polyurethane in 400 pieces showed an average of 40.1%, a minimum value of 38.6% and a maximum value of 41.1%. A ratio of the polyurethane molding to the ethylenically unsaturated compound polymer was 100/149.4.

Using the polishing pad, polishing was evaluated. As a result, the 1st and 20th polishing rates were respectively 1,850 angstroms/minute and 1,900 angstroms/minute, and in-plane uniformities were respectively 7% and 7%. After polishing 500 samples, the polishing rate was 1,850 angstroms/minute and in-plane uniformity was 7%. With respect to flattening properties, flattening required polishing for 120 seconds.

Example 7

The 1/5 and 4/5 portions of the interpenetrating polymer network structure of Example 6 in the thickness direction were sliced and surface-ground to obtain sheets having a thickness of 2 m. No. 1 small-sized specimen was punched out from the center portion of the sheet, and then a tensile breaking strength and a tensile breaking elongation were measured and found to be a tensile breaking strength 15.6 MPa and a tensile breaking elongation of 312%, and a tensile breaking strength of 15.5 MPa and a tensile breaking elongation of 316%.

With respect to the sheet having a thickness of 2 mm obtained from the 1/5 portion in the thickness direction, a weight ratio of polyurethane to the sum of polyurethane and PMMA was calculated. As a result, the weight ratio of polyurethane in 400 pieces showed an average of 39.9%, a minimum value of 38.7% and a maximum value of 41.4%. A ratio of the polyurethane molding to the ethylenically unsaturated compound polymer was 100/150.6.

In Example 6 and Example 7, there was a small difference in the values of the tensile breaking strength and tensile breaking elongation of the tensile test piece having a thickness about 2 mm obtained from the same interpenetrating polymer network structure in and between sheets. Also, distributions of the weight ratio of polyurethane of Example 6 and Example 7 in the sheet were respectively 40.1±1.4(%) and 39.9±1.4(%) and a composition distribution width in the sheet surface was small. It is also apparent that since the composition of the center sheet and the surface layer sheet in the thickness direction are almost the same, the compositing is also uniform in the thickness direction. Namely, it is apparent that both uniformity in the sheet surface and uniformity of the composition between sheets are improved by using a chain transfer agent in combination with a polymerization inhibitor.

Example 8

Using the polyurethane raw material composition of Comparative Example 1, a polyurethane molding containing closed cells having an apparent density of 0.51 g/cm$^3$ and an average cell diameter of 77 μm was obtained.

The following radical polymerizable composition was prepared and the above-mentioned polyurethane molding was immersed therein at 20° C. for 24 hours. As a result, the polyurethane molding was impregnated with the entire amount of the radical polymerizable composition. A weight of the polyurethane molding to the radical polymerizable composition was 100/50.

| Methyl methacrylate | 300 parts by weight |
|---|---|
| Azobis(2-methylbutyronitrile) | 1.5 parts by weight |
| n-dodecylmercaptan | 0.7 part by weight |

The polyurethane molding swollen by impregnation was interposed between two glass plates via a gasket made of vinyl chloride, followed by sealing by fixing the periphery. The radical polymerizable composition was cured by heating at 70° C. for 5 hours and heating in an oven at 100° C. for 3 hours to obtain an interpenetrating polymer network structure.

The center portion of the resulting interpenetrating polymer network structure in the thickness direction was sliced and surface-ground to obtain a sheet having a thickness of 2 mm.

The above-mentioned sheet was punched out to obtain a circle having a diameter of 600 mm and a lattice pattern-like groove measuring 1.0 mm in width, 0.5 mm in depth and mm in pitch was formed on one surface to produce a polishing pad. The polishing pad had an apparent density of 0.55 g/cm$^3$, and closed cells had an average cell diameter of 83 μm. Openings derived from cells (75 cells/mm$^2$) were observed on the surface.

As a result of evaluation of polishing, the 1st and 20th polishing rates were respectively 1,200 angstroms/minute and 1,230 angstroms/minute, and in-plane uniformities were respectively 10% and 9%. After polishing 500 samples, the polishing rate was 1,210 angstroms/minute and in-plane uniformity was 9%.

Comparative Example 4

The following raw material compositions were charged in a first raw material tank and a second raw material tank of a RTM molding machine, were poured into a die and then cured to obtain a polyurethane molding measuring 850 mm×850 mm and 12 mm in thickness. The resulting polyurethane molding had an apparent density of 0.77 g/cm$^3$ and closed cells having an average cell diameter of 32 μm were observed.

| <First Raw Material Tank> | |
|---|---|
| Polypropylene glycol | 85 parts by weight |
| Diethylene glycol | 15 parts by weight |
| Tin octylate | 0.5 part by weight |
| Silicone-based foam stabilizer | 3 parts by weight |
| Purified water | 0.3 part by weight |
| <Second Raw Material Tank> | |
| Diphenylmethane diisocyanate | 120 parts by weight |

The following radical polymerizable composition was prepared and the above-mentioned polyurethane molding was immersed therein at 20° C. for 3 days. As a result, the polyurethane molding was not impregnated with the entire amount of the radical polymerizable composition, and therefore immersion was continued. After further immersing at 20° C. for 4 hours, namely, 7 days in total, the polyurethane molding was impregnated with the entire amount of the radical polymerizable composition. A weight ratio of the polyurethane molding to the radical polymerizable composition was 100/160. Since the organic solvent component is removed after curing, a weight ratio of the polyurethane molding to the radical polymerizable composition is substantially 100/120.

| Methyl methacrylate | 300 parts by weight |
|---|---|
| Azobisisobutyronitrile | 1.5 parts by weight |
| n-decane | 100 parts by weight |

The polyurethane molding swollen by impregnation was interposed between two glass plates via a gasket made of vinyl chloride, followed by sealing by fixing the periphery. The radical polymerizable composition was cured by heating at 70° C. in a water bath for 5 hours and heating in an oven at 100° C. for 3 hours to obtain an interpenetrating polymer network structure. The interpenetrating polymer network structure was released from the glass plates and then vacuum-dried at 50° C. for 12 hour and then at 100° C. for 12 hours to remove a component which can be removed under reduced pressure.

The center portion of the interpenetrating polymer network structure in the thickness direction was sliced and surface-ground to obtain a sheet having a thickness of 2 mm. The No. 1 small-sized specimen was punched out from the sheet, and then a tensile breaking strength and a tensile breaking elongation were measured and found to be 10.3 MPa and 260%. Also a No. 1 small-sized specimen was punched out from the end portion of the sheet and then a tensile breaking strength and a tensile breaking elongation and found to be 9.2 MPa and 190%. The sheet was punched out and ground to obtain a circle having a diameter of 600 mm and a thickness of 2 mm and having a lattice pattern-like groove measuring 2 mm in width, 0.6 mm in depth and 40 mm in pitch was formed on one surface to produce a polishing pad. The polishing pad had an apparent density of 0.80 g/cm$^3$, and closed cells had an average cell diameter of 39 μm. Openings derived from cells (350 cells/mm$^2$) were observed on the surface.

As a result of evaluation of polishing, 1st and a 10th polishing rates were respectively 1,700 angstroms/minute and 1,650 angstroms/minute, and in-plane uniformities were respectively 16% and 17%. After polishing 100 samples, the polishing rate was 1,400 angstroms/minute and in-plane uniformity was 28%.

Comparative Example 5

In the very same manner as in Comparative Example 1, except that impregnation was performed under the condition of 60° C., a polyurethane molding was immersed in a radical polymerizable composition for 5 hours. As a result, curing proceeded before impregnating the polyurethane molding with the entire amount of the radical polymerizable composition and thus the polyurethane molding and the cured radical polymerizable composition were not integrated.

Example 9

The following radical polymerizable composition was prepared and the polyurethane molding produced in Comparative Example 4 was immersed at 40° C. for 3 days. As a result, the polyurethane molding was impregnated with the entire amount of the radical polymerizable composition. A weight ratio of the polyurethane molding to the radical polymerizable composition was 100/120.

| Methyl methacrylate | 300 parts by weight |
|---|---|
| Azobisisobutyronitrile | 1.5 parts by weight |
| 2,6-di-t-butyl-4-methylphenol | 0.2 part by weight |

The polyurethane molding swollen by impregnation was interposed between two glass plates via a gasket made of vinyl chloride, followed by sealing by fixing the periphery. The radical polymerizable composition was cured by heating at 70° C. in a water bath for 5 hours and heating in an oven at 100° C. for 3 hours to obtain an interpenetrating polymer network structure. The interpenetrating polymer network structure was released from the glass plates and the center portion of the interpenetrating polymer network structure in the thickness direction was sliced and surface-ground to obtain a sheet having a thickness of 2 mm.

The No. 1 small-sized specimen was punched out from the sheet, and then a tensile breaking strength and a tensile breaking elongation were measured and found to be 10.3 MPa and 260%. Also a No. 1 small-sized specimen was punched out from the peripheral portion of the sheet and then a tensile breaking strength and a tensile breaking elongation and found to be 10.2 MPa and 260%.

The above-mentioned sheet was punched out and ground to obtain a circle having a diameter of 600 mm and a thickness of 2 mm and having a lattice pattern-like groove measuring 2 mm in width, 0.6 mm in depth and 40 mm in pitch was formed on one surface to produce a polishing pad. The polishing pad had an apparent density of 0.80 g/cm$^3$, and closed cells had an average cell diameter of 39 μm. Openings derived from cells (350 cells/mm$^2$) were observed on the surface.

As a result of evaluation of polishing, the 1st and a 10th polishing rates were respectively 1,700 angstroms/minute and 1,650 angstroms/minute, and in-plane uniformities were respectively 8% and 8%. After polishing samples, the polishing rate was 1,700 angstroms/minute and in-plane uniformity was 8%.

Example 10

In a first raw material tank and a second raw material tank of an RIM molding machine, the following raw material compositions were charged and, after loading a nitrogen gas in the first raw material tank, the raw material compositions were poured into a die and then cured to obtain a polyurethane molding measuring 850 mm×850 mm and 12 mm in thickness. The resulting polyurethane molding had an apparent density of 0.77 g/cm$^3$ and closed cells having an average cell diameter of 32 μm were observed.

| <First Raw Material Tank> | |
|---|---|
| Polypropylene glycol | 85 parts by weight |
| Diethylene glycol | 15 parts by weight |
| Tin octylate | 0.5 part by weight |
| Silicone-based foam stabilizer | 3 parts by weight |
| Purified water | 0.3 part by weight |
| 2,6-di-t-butyl-4-methylphenol | 0.1 part by weight |
| <Second Raw Material Tank> | |
| diphenylmethane diisocyanate | 120 parts by weight |

The following radical polymerizable composition was prepared and the above-mentioned polyurethane molding was immersed therein at 40° C. for 3 days. As a result, the polyurethane molding was impregnated with the entire amount of the radical polymerizable composition. A weight ratio of the polyurethane molding to the radical polymerizable composition was 100/120.

| Methyl methacrylate | 300 parts by weight |
|---|---|
| Azobisisobutyronitrile | 1.5 parts by weight |
| 2,6-di-t-butyl-4-methylphenol | 0.1 part by weight |

The polyurethane molding swollen by impregnation was interposed between two glass plates via a gasket made of vinyl chloride, followed by sealing by fixing the periphery. The radical polymerizable composition was cured by heating in a water bath at 70° C. for 5 hours and heating in an oven at 100° C. for 3 hours to obtain an interpenetrating polymer network structure. The resultant interpenetrating polymer network structure was released from the glass plates and the center portion of the interpenetrating polymer network structure in the thickness direction was sliced and surface-ground to obtain a sheet having a thickness of 2 mm.

A No. 1 small-sized specimen was punched out from the sheet, and then a tensile breaking strength and a tensile breaking elongation were measured and found to be 10.3 MPa and 260%. Also a No. 1 small-sized specimen was punched out from the end portion of the sheet and then a tensile breaking strength and a tensile breaking elongation and found to be 10.3 MPa and 260%.

The sheet having a thickness of 2 mm cut from the center portion in the thickness direction was punched out to obtain a circle having a diameter of 600 mm and a thickness of 2 mm and having a lattice pattern-like groove measuring 2 rum in width, 0.6 mm in depth and 40 mm in pitch was formed on one surface to produce a polishing pad. The polishing pad had an apparent density of 0.80 g/cm$^3$, and closed cells had an average cell diameter of 39 μm. Openings derived from cells (350 cells/mm$^2$) were observed on the surface.

As a result of evaluation of polishing, 1st and a 20th polishing rates were respectively 1,700 angstroms/minute and 1,700 angstroms/minute, and in-plane uniformities were respectively 8% and 8%. After polishing samples, the polishing rate was 1,700 angstroms/minute and in-plane uniformity was 7%.

Example 11

In a first raw material tank and a second raw material tank of an RIM molding machine, the following raw material compositions were charged and, after loading a nitrogen gas in the first raw material tank, the raw material compositions were poured into a die and then cured to obtain a polyurethane molding measuring 850 mm×850 mm and 12 mm in thickness. The resulting polyurethane molding had an apparent density of 0.82 g/cm$^3$ and closed cells having an average cell diameter of 28 μm were observed.

| <First Raw Material Tank> | |
|---|---|
| Polypropylene glycol | 85 parts by weight |
| Diethylene glycol | 15 parts by weight |
| α-methylstyrene dimer | 0.4 part by weight |
| 2,6-di-t-butyl-4-methylphenol | 0.1 part by weight |
| Tin octylate | 0.5 part by weight |
| Silicone-based foam stabilizer | 3 parts by weight |
| Purified water | 0.3 part by weight |
| <Second Raw Material Tank> | |
| diphenylmethane diisocyanate | 120 parts by weight |

The following radical polymerizable composition was prepared and the above-mentioned polyurethane molding was immersed therein at 20° C. for 7 days. As a result, the polyurethane molding was impregnated with the entire amount of the radical polymerizable composition. A weight ratio of the polyurethane molding to the radical polymerizable composition was 100/140.

| Methyl methacrylate | 300 parts by weight |
|---|---|
| Azobisisobutyronitrile | 0.5 part by weight |

The polyurethane molding swollen by impregnation was interposed between two glass plates via a gasket made of vinyl chloride, followed by sealing by fixing the periphery.

The radical polymerizable composition was cured by heating at 70° C. for 5 hours and heating in an oven at 100° C. for 3 hours to obtain an interpenetrating polymer network structure. The resultant interpenetrating polymer network structure was released from the glass plates and the weight was measured. Immediately after drying at 50° C. for 12 hours, 100° C. for 12 hours and then at a normal temperature for 12 hours, the weight was measured. As a result, a weight loss was not confirmed when compared with that before drying.

The measurement of a relaxation time of an interpenetrating polymer network structure by a solid NMR (nuclear magnetic resonance) method revealed that a structure in which PMMA is dispersed in several tens of nanometers or smaller in a polyurethane molding and two polymer chains of polyurethane and PMMA are mutually penetrated to cause entanglement of polymer chains. Namely, the fact that the relaxation time of the interpenetrating polymer network structure is longer than that of the polyurethane molding alone and that of the methyl methacrylate polymer alone, revealed that the interpenetrating polymer network structure is formed.

The center portion of the interpenetrating polymer network structure in the thickness direction was sliced and surface-ground to obtain a sheet having a thickness of 2 mm. A No. 1 small-sized specimen was punched out from the center portion of the sheet, and then a tensile breaking strength and a tensile breaking elongation were measured and found to be 16.6 MPa and 310%. No. 1 small-sized specimen was punched out from the end portion of the sheet, and then a tensile breaking strength and a tensile breaking elongation were measured and found to be 16.5 MPa and 300%.

With respect to the above-mentioned sheet, a weight ratio of polyurethane to the sum of polyurethane and PMMA was calculated. As a result, the weight ratio of polyurethane in 400 pieces showed an average of 43.0%, a minimum value of 41.6% and a maximum value of 44.5%. A ratio of the polyurethane molding to the ethylenically unsaturated compound polymer was 100/132.5.

The above-mentioned sheet was punched out to obtain a circle having a diameter of 600 mm and a lattice pattern-like groove measuring 1.5 mm in width, 0.5 mm in depth and mm in pitch was formed on one surface to produce a polishing pad. The polishing pad had an apparent density of 0.84 g/cm$^3$, and closed cells had an average cell diameter of 34 μm. Openings derived from cells (392 cells/mm$^2$) were observed on the surface.

Polishing was evaluated. As a result, the 1st and 20th polishing rates were respectively 1,900 angstroms/minute and 1,900 angstroms/minute, and in-plane uniformities were respectively 7% and 8%. After polishing 500 samples, the polishing rate was 1,850 angstroms/minute and in-plane uniformity was 8%. With respect to flattening properties, flattening required polishing for 120 seconds.

Example 12

The ⅕ and ⅘ portions of the interpenetrating polymer network structure of Example 11 in the thickness direction were sliced and surface-ground to obtain sheets having a thickness of 2 mm. No. 1 small-sized specimen was punched out from the center portion of the sheet, and then a tensile breaking strength and a tensile breaking elongation were measured and found to be a tensile breaking strength 17.5 MPa and a tensile breaking elongation of 330%, and a tensile breaking strength of 17.3 MPa and a tensile breaking elongation of 330%.

With respect to the sheet having a thickness of 2 mm obtained from the ⅕ portion in the thickness direction, a weight ratio of polyurethane to the sum of polyurethane and PMMA was calculated. As a result, the weight ratio of polyurethane in 400 pieces showed an average of 40.4%, a minimum value of 39.0% and a maximum value of 41.8%. A ratio of the polyurethane molding to the ethylenically unsaturated compound polymer was 100/147.5.

In Example 11 and Example 12, there was a small difference in the values of the tensile breaking strength and tensile breaking elongation of the tensile test piece having a thickness about 2 mm obtained from the same interpenetrating polymer network structure in and between sheets. Also, distributions of the weight ratio of polyurethane of Example 11 and Example 12 in the sheet were respectively 43.0±1.5(%) and 40.4±1.4(%) and a composition distribution width in the sheet surface was small. It is also apparent that since the composition of the center sheet and the surface layer sheet in the thickness direction are almost the same, the compositing is also uniform in the thickness direction. Namely, it is apparent that both uniformity in the sheet surface and uniformity of the composition between sheets are improved by adding a polymerization inhibitor.

As described above, in the interpenetrating polymer network structures of the Examples and Comparative Examples, there was a difference in mechanical properties, although apparent density, average cell diameter of closed cells and number of cells are the same. The interpenetrating polymer network structures of the Examples showed high tensile breaking strength, high tensile breaking elongation, small distribution of the tensile breaking strength and tensile breaking elongation depending on the position, and high uniformity when compared with those of the Comparative Examples. Furthermore, the polishing pads obtained from the interpenetrating polymer network structures of the Examples showed high in-plane uniformity of during CMP polishing and excellent flattening properties and remarkably improved pad lifetime.

Industrial Applicability

The polishing pad of the present invention can be used for polishing semiconductor substrates such as silicone wafers; optical members such as lens; and electronic materials such as magnetic heads and hard disks. Particularly, the polishing pad of the present invention can be used as a polishing pad for a polishing treatment of semiconductor wafers as materials to be polished for the purpose of flattening semiconductor wafers using a chemical mechanical polishing (CMP) technique.

The invention claimed is:
1. A process for producing an interpenetrating polymer network structure, which comprises the steps of impregnating a polymer molding with a radical polymerizable composition containing an ethylenically unsaturated compound and a radical polymerization initiator; and polymerizing the ethylenically unsaturated compound in a swollen state of the polymer molding impregnated with the radical polymerizable composition; wherein a chain transfer agent is added to the radical polymerizable composition and/or the polymer molding before impregnating the polymer molding with the radical polymerizable composition, and the chain transfer agent is at least one kind of a compound selected from mercaptan having an alkyl group having 3 to 12 carbon atoms and an aromatic hydrocarbon-based chain transfer agent.

2. The process for producing an interpenetrating polymer network structure according to claim 1, wherein a chain transfer agent is added to the polymer molding.

3. The process for producing an interpenetrating polymer network structure according to claim 1, wherein the chain transfer agent has a molecular weight of 350 or less.

4. The process for producing an interpenetrating polymer network structure according to claim 2, wherein the chain transfer agent is added to the polymer molding in an amount of 0.01 to 20% by weight based on 100% by weight of the polymer molding.

5. The process for producing an interpenetrating polymer network structure according to claim 1, wherein a radical polymerization inhibitor is further added to the radical polymerizable composition and/or the polymer molding before impregnating the polymer molding with the radical polymerizable composition, and the radical polymerization inhibitor is at least one kind of a compound having aromatic ring and at least one hydroxyl group.

6. The process for producing an interpenetrating polymer network structure according to claim 1, wherein the radical polymerizable composition does not substantially contain an organic solvent.

7. The process for producing an interpenetrating polymer network structure according to claim 1, wherein the ethylenically unsaturated compound is a compound selected from methyl methacrylate, ethyl methacrylate, i-propyl methacrylate and t-butyl methacrylate.

8. The process for producing an interpenetrating polymer network structure according to claim 1, wherein an ethylenically unsaturated compound is polymerized in the presence of an oxygen gas or an oxygen-containing gas.

9. A process for producing a polishing pad, which comprises the step of forming a polishing pad using the interpenetrating polymer network structure obtained by the method according to claim 1.

10. A process for producing an interpenetrating polymer network structure, which comprises the steps of impregnating a polymer molding with a radical polymerizable composition containing an ethylenically unsaturated compound and a radical polymerization initiator; and polymerizing the ethylenically unsaturated compound in a swollen state of the polymer molding impregnated with the radical polymerizable composition; wherein a chain transfer agent is added to the radical polymerizable composition before impregnating the polymer molding with the radical polymerizable composition.

* * * * *